(12) United States Patent
Fliess et al.

(10) Patent No.: US 9,457,935 B2
(45) Date of Patent: Oct. 4, 2016

(54) DOSING SYSTEM, DOSING METHOD AND PRODUCTION METHOD

(71) Applicant: VERMES MICRODISPENSING GmbH, Otterfing (DE)

(72) Inventors: Mario Fliess, Munich (DE); Juergen Staedtler, Feldkirchen-Westerham (DE)

(73) Assignee: VERMES MICRODISPENSING GmbH, Otterfing (DE)

( * ) Notice: Subject to any disclaimer, the term of this patent is extended or adjusted under 35 U.S.C. 154(b) by 0 days.

(21) Appl. No.: 14/432,134

(22) PCT Filed: Aug. 22, 2013

(86) PCT No.: PCT/EP2013/067490
§ 371 (c)(1),
(2) Date: Mar. 27, 2015

(87) PCT Pub. No.: WO2014/048643
PCT Pub. Date: Apr. 3, 2014

(65) Prior Publication Data
US 2015/0274371 A1 Oct. 1, 2015

(30) Foreign Application Priority Data

Sep. 27, 2012 (DE) .......................... 10 2012 109 123

(51) Int. Cl.
*B65D 25/42* (2006.01)
*B05C 5/02* (2006.01)
(Continued)

(52) U.S. Cl.
CPC ........... *B65D 25/42* (2013.01); *B05B 17/0623* (2013.01); *B05C 5/0225* (2013.01);
(Continued)

(58) Field of Classification Search
CPC . B05B 17/0623; B05B 17/0669; B05B 1/02; B65D 25/42; B05C 5/0225; B05C 5/0229; G01F 11/021

USPC .................. 222/1, 566, 504, 559; 29/428
See application file for complete search history.

(56) References Cited

U.S. PATENT DOCUMENTS 4,319,716 A * 3/1982 Lauer .................. B05B 17/0623
239/102.2
4,431,136 A   2/1984 Janner et al.
(Continued)

FOREIGN PATENT DOCUMENTS

CH          703050 A2    10/2011
CN       201316685 Y     9/2009
(Continued)

OTHER PUBLICATIONS

International Search Report; PCT/EP2013/067490; Dec. 20, 2013.
(Continued)

*Primary Examiner* — Donnell Long
(74) *Attorney, Agent, or Firm* — Studebaker & Brackett PC (57) ABSTRACT

The present invention relates to a dosing system with a nozzle having an outlet opening, in the region of which a closure element is movably arranged, which is moved in an ejection and/or retracting direction during operation, wherein the closure element is thus coupled to at least two piezoelectric actuators which are connected in opposite direction such that a first piezoelectric actuator, when it is expanded in operation, moves the closure element in the retracting direction and a second piezoelectric actuator, when it is expanded in operation, moves the closure element in the ejection direction. The invention also relates to a dosing method that can be carried out using such a dosing system and to a method for producing such a dosing system.

17 Claims, 8 Drawing Sheets (51) Int. Cl.
*G01F 11/02* (2006.01)
*B05B 17/06* (2006.01)
*B05B 1/02* (2006.01)

(52) U.S. Cl.
CPC ........... *B05C5/0229* (2013.01); *G01F 11/021* (2013.01); *B05B 1/02* (2013.01); *B05B 17/0669* (2013.01); *Y10T 29/49826* (2015.01)

(56) References Cited

U.S. PATENT DOCUMENTS

| | | | |
|---|---|---|---|
| 4,436,364 | A | 3/1984 | Lauer et al. |
| 4,828,779 | A | 5/1989 | Hiraki et al. |
| 5,094,399 | A | 3/1992 | Zaber |
| 5,516,043 | A * | 5/1996 | Manna ................ B05B 17/063 239/102.2 |
| 5,536,531 | A | 7/1996 | Owen et al. |
| 5,810,255 | A | 9/1998 | Itoh et al. |
| 6,345,771 | B1 | 2/2002 | Gromek et al. |
| 6,450,416 | B1 | 9/2002 | Berg et al. |
| 6,589,791 | B1 | 7/2003 | LaBudde et al. |
| 6,685,444 | B2 * | 2/2004 | Ogawa .................... F04B 13/00 222/504 |
| 7,767,266 | B2 | 8/2010 | Holm et al. |
| 2002/0025260 | A1 | 2/2002 | Maruyama |
| 2002/0071772 | A1 | 6/2002 | Isogai et al. |
| 2002/0197173 | A1 | 12/2002 | Ogawa |
| 2003/0211620 | A1 | 11/2003 | LaBudde et al. |
| 2004/0118865 | A1 | 6/2004 | Maruyama et al. |
| 2005/0167519 | A1 | 8/2005 | Holm et al. |
| 2005/0236438 | A1 * | 10/2005 | Chastine ................ B05C 5/001 222/504 |
| 2007/0129681 | A1 * | 6/2007 | Ott ...................... A61M 5/1452 604/152 |
| 2007/0241213 | A1 * | 10/2007 | Bondi ................ F02M 51/0603 239/584 |
| 2008/0105703 | A1 | 5/2008 | Prentice et al. |
| 2009/0053079 | A1 | 2/2009 | Ogawa |
| 2011/0017841 | A1 | 1/2011 | Holm et al. |
| 2011/0253741 | A1 | 10/2011 | Prentice et al. |
| 2013/0037578 | A1 * | 2/2013 | Mortazavi ......... A61M 5/14546 222/326 |

FOREIGN PATENT DOCUMENTS

| | | |
|---|---|---|
| CN | 101858438 A | 10/2010 |
| DE | 1400725 | 10/1968 |
| DE | 19531652 A1 | 5/1997 |
| DE | 10130856 A1 | 1/2002 |
| DE | 10050469 A1 | 4/2002 |
| DE | 10345840 A1 | 4/2005 |
| EP | 0048364 A2 | 3/1982 |
| EP | 1816341 A1 | 8/2007 |
| GB | 2394915 A | 5/2004 |
| GB | 2451833 A | 2/2009 |
| JP | 2001-046940 A | 2/2001 |
| WO | 99/64167 A | 12/1999 |
| WO | 2004/010753 A1 | 1/2004 |
| WO | 2008/054930 A1 | 5/2008 |

OTHER PUBLICATIONS

Chinese Search Report issued May 5, 2016 which corresponds to Chinese Patent Application No. 2013800507087 and is related to U.S. Appl. No. 14/432,134.

The First Chinese Office Action issued Jun. 2, 2016, which corresponds to Chinese Patent Application No. 201380050879.4 and is related to U.S. Appl. No. 14/432,134; with English language translation.

* cited by examiner

DOSING SYSTEM, DOSING METHOD AND PRODUCTION METHOD

The present invention relates to a dosing system for a liquid to viscous dosing material or a medium to be dispensed, with a nozzle comprising an outlet opening, in the region of which a closing element is movably arranged, which closing element can be moved in an ejection direction and/or a retraction direction. The invention also relates to a dosing method for such a dosing material, and to a method of manufacturing such a dosing system.

The dispensing of liquid to viscous dosing materials such as adhesives, paints, printing varnishes, conductive substances such as solder paste bound in a binding agent, converter materials for LEDs (generally viscous pastes with a high filler content, in particular ceramic fillers), etc., serves to precisely apply such dosing materials onto target surfaces. For example, conductive substances can be applied precisely and accurately onto electronic circuit boards, replacing relatively inflexible procedures such as masking and using a doctor blade. A particular challenge lies in applying the dosing materials very precisely, i.e. at the right time, in the right place, and in an exactly dosed quantity, to the target surface. This can be achieved, for example, by a drop-by-drop release through the nozzle of a dosing system, whereby the size and/or number of the droplets are previously determined as accurately as possible by the action of the nozzle. Alternatively, the dosing material can be sputtered in a jet, or sprayed in a mist.

U.S. Pat. No. 6,450,416 B1 discloses a dosing system of the type described above, in which a piezoelectric actuator is connected to a plunger and moves the plunger in an ejection direction and/or a withdrawal direction. Such a system can allow a very precise and very fast plunger motion. However, it has the disadvantage that vibrations in the dosing system can be provoked by the possibly very rapid stroke movements of the piezoelectric actuator, which can significantly reduce the running smoothness and which can mechanically strain the dosing system.

It is an object of the invention to provide an improvement to the dosing system described above. In particular, special focus is given to reducing vibrations and/or mechanical strain of the dosing system and/or its individual components.

The object is achieved by the dosing system of claim 1; by the dosing method of claim 14; and by the manufacturing method of claim 15.

According to the invention, the closure element is coupled with at least two piezoelectric actuators that are connected in opposite directions such that a first piezoelectric actuator, when expanded during operation, moves the closure element in the retracting direction; and a second piezoelectric actuator, when expanded during operation, moves the closure element in the ejection direction.

The coupling of the closure element can be effected directly, i.e. the closure element is, for example, directly connected to the first piezoelectric actuator and/or to the second piezoelectric actuator or, depending on the specific construction, is held between these. Equally, the closure element can be indirectly coupled to the first piezoelectric actuator and/or to the second piezoelectric actuator, for example through appropriate coupling or connection elements, a lever arrangement, or any other mechanism.

The invention therefore allows a push-push configuration to be realized, in which one of the piezoelectric actuators pushes or presses the closure element (directly or indirectly) at any one time in the desired direction. In other words, while a first actuator extends and pushes the closure element into one of the two directions, the second actuator contracts and thereby frees up the space necessary for the closure element to move in the desired direction. Should the closure element then be moved in the opposite direction, the functions of the actuators are reversed, i.e. the second actuator expands once again and pushes the closure element, while the first actuator contracts to make room.

Since piezoelectric elements are generally resilient under compression, whereas a tensile load can quickly lead to damage or complete destruction of the piezoelectric elements, a particularly stable piezoelectric actuator system is provided in this way.

The dimensions, arrangement and control of the actuators may particularly preferably be chosen such that the contracting actuator continues to exert a (small) counter-pressure and thus ensures a certain preloading of the expanding piezoelectric actuator, so that the latter will not overshoot excessively at the end of its movement. This avoids or minimizes internal stress that could lead to damage of the piezoelectric elements. In this case, therefore, oppositely directed compressive forces are applied by the two actuators during a movement of the closure element in the ejection direction as well during a movement in the retraction direction, whereby the momentary difference in the compressive forces determines the current direction of motion. This permits a particularly rapid movement of the closure element with a high frequency and very steep transitions.

A dosing method for a dosing material according to the invention is achieved by means of a dosing system with a nozzle comprising an outlet opening, in the region of which a closure element is moved in a retraction direction by the expansion of a first piezoelectric actuator, and is moved in an ejection direction by the expansion of a second piezoelectric actuator to eject dosing material from the nozzle.

A manufacturing method for a dosing system according to the invention comprises at least the following steps:
providing a nozzle that comprises an outlet opening,
moveably arranging a closure element in the region of the nozzle,
coupling the closure element with at least two piezoelectric actuators, whereby the piezoelectric actuators are arranged and coupled with the closure element such that a first piezoelectric actuator, when it is expanded in operation, moves the closure element in the retraction direction, and a second piezoelectric actuator, when expanded in operation, moves the closure element in the ejection direction.

The closure element can be understood to be a one-piece or multi-piece element that preferably comprises an elongated shape, such as a cylindrical shape, for example a plunger, and can be made using silicon. Equally, the closure element may be round or oval, arranged and movably supported in the closure channel. The closure element can be arranged in a closure channel, i.e. a hollow body, preferably a cylindrical hollow body that defines or encloses a cavity on its inside, within which the closure element is at least partially arranged such that the closure element "closes" the cavity in the context of the invention. It should be noted, however, that the closing action can be complex and does not necessarily involve a complete sealing of the cavity by the closure element: the dosing system according to the invention can also be an open system, as will be described in greater detail below.

As described above, the dosing system according to the invention comprises an actuator system for an automated controlled movement of the closure element, whereby the actuator system comprises at least two piezoelectric actuators. Piezoelectric actuators generally have the advantage of very precise and fast controllability, in particular short reaction time, compared to other mechanical, electromechanical or pneumatic/hydraulic systems. Furthermore, they require relatively little space. In the context of the invention, a piezoelectric actuator may be understood to be a component that may be composed of several elements—for example a plurality of layered or parallel adjacent piezoelectric crystals or crystal layers or similar piezoelectric elements—but which forms a composite that is controlled as one by a control unit, for example by comprising a shared electrical connection for controlling the individual elements of which it is composed. The actuator elements can each behave as in a series connection, i.e. the expansions of the piezo-elements are accumulated, or as a parallel connection, i.e. the actuator elements are connected alongside each other such as to increase the effective pressure area. In the case of several parallel actuator elements, each of these can be realized as a layer of series-connected piezoelectric elements (referred to as piezo-stacks).

Other particularly advantageous embodiments and modifications of the invention will become apparent from the dependent claims and the following description. The method can be further developed using features of the dependent claims relating to the nozzle or metering device and as outlined in the following description, and vice versa. Features of the various embodiments can be combined in any manner to give further embodiments within the scope of the invention.

The first piezoelectric actuator and the second piezoelectric actuator are preferably arranged and formed such that the ejection direction and the retraction direction of the closure element lie essentially along, i.e. parallel to or preferably coaxial with, an effective direction axis of the piezoelectric actuators. The effective direction axis of an actuator is to be understood as the (imaginary) axis along which the actuator has its main extension direction and in which it exerts the desired pressure or performs as a pressure member. A parallel alignment, in particular a coaxial alignment, of the effective direction axes of the actuators and the ejection or retraction directions of the closure element results in particularly low active power losses being recorded in the movement of the closure element. On the one hand, this increases the precision of the closure element and the possible speed of the closure element member on the other hand, and therefore increases the overall efficiency of the dosing system.

Preferably, the effective direction axes of the two piezoelectric actuators coincide in a single effective direction axis. To this end, the first piezoelectric actuator and the second piezoelectric actuator may be arranged for example one behind the other along the effective direction axis. In a particularly preferred embodiment, the ejection direction or retraction direction of the closure element then lies along this common effective direction axis of the piezoelectric actuators.

Thereby, the opening or closing direction of the closure element can be coaxial to the effective direction of the piezoelectric actuators, in particular in the case of an annular realization of the piezoelectric actuators or in the case of several actuator elements working in parallel, arranged for example about a kind of effective axis in which the closure element moves; or can be parallel to the effective direction in the case of piezoelectric actuators that are realized in a different way. That the effective directions of the actuators and the opening and closing direction of the closure element are the same has the effect that particularly low power losses are observed in the movement of the closure element. This increases the precision of the closure element on the one hand, and the speed on the other hand, and therefore the overall effectiveness of the dosing system. This enables the dosing system to achieve significantly high resonant frequencies and a correspondingly high efficiency.

In particular, when the first piezoelectric actuator and the second piezoelectric actuator are arranged one behind the other along the effective direction axis, the closure element can preferably be coupled (directly or indirectly) with the first piezoelectric actuator and/or with the second piezoelectric actuator at a junction between the first piezoelectric actuator and the second piezoelectric actuator. The junction is to be understood as the space between the boundary faces or ends of the two piezoelectric actuators arranged in line. To this end, a coupling portion of the closure element is "arranged in series" between the two piezoelectric actuators.

Preferably, the closure element can be securely clamped between the first and second piezoelectric actuator. This leads to an effective transfer of forces between the piezoelectric actuators and the closure element, significantly reducing friction and load-transfer losses, and thereby contributing to the increase in effectiveness of the overall dosing system. Furthermore, the closure element can be securely affixed to the first or second piezoelectric actuator, for example in a cavity of the first or second piezoelectric actuator.

The dosing system can preferably be constructed so that, in combination, the two piezoelectric actuators always have the same total overall length along their effective direction axis, and mutually cancel out their extension, i.e. so that the movement of the first piezoelectric actuator in operation cancels out the movement of the second piezoelectric actuator, and the movement of the second piezoelectric actuator in operation cancels out the movement of the first piezoelectric actuator. In this way, mechanical stresses on the overall construction (in particular the outer construction) of the dosing system can be kept as low as possible. With the exception of inertial forces, forces that act in an outward direction, for example external to an actuator chamber in which the actuators might be arranged, hardly ever arise, since basically no dynamic movement is passed on to the outside. Preferably, therefore, the dimensional change of the first piezoelectric actuator during operation offsets a dimensional change of the second piezoelectric actuator, and the dimensional change of the second piezoelectric actuator during operation offsets a dimensional change of the first piezoelectric actuator. Such a mutual offset is achieved on the one hand by the (preferably identical or almost identical) stroke length of both piezoelectric actuators, for example by using piezoelectric actuators with equal sizes in the direction of the dimensional change, preferably by using identically constructed piezoelectric actuators. On the other hand, one or more control units must be realized for one or both piezoelectric actuators in order to generate control signals during operation that ensure such a mutual offset of the relevant dimensional changes of the piezoelectric actuators. In other words, the structural form of the piezoelectric actuators and their controller(s) are coordinated to achieve such a mutual offset.

As mentioned above, it is generally possible that realization of the closure element can be drop-shaped, spherical, elliptical, irregular, one-sided or two-sided conical, etc. However, it is particularly preferable that the nozzle comprises a closure element that defines an effective direction of the closure element through its longitudinal extension. Preferably, it comprises a long plunger. Such a plunger comprises an essentially cylindrical construction, but may comprise bulges or recesses on parts of its outer surface, which may also be realised as through-holes (this applies to any realization of the closure element). Such bulges or recesses can serve in particular to connect the closure element with engagement elements of other mechanical arrangements. By means of these engagement points, a force-fit or form-fit can be achieved with such arrangements, for the purpose of a controlled movement of the closure element.

At least one of the piezoelectric actuators has a cylindrical realization, preferably a tubular realization. In this way, it can be realized in a particularly uniform manner and comprises a particularly favourable cross-section: it can be inserted into an actuator chamber in a particularly straightforward way, since cylindrical cross-sections of actuator chambers are particularly simple to manufacture and provide, compared to rectangular chambers. However, it is also possible to realize at least one of the piezoelectric actuators in a non-cylindrical fashion, for example in an angled fashion. A combination of a first cylindrical piezoelectric actuator and a second non-cylindrical actuator is also possible. (Right-) angled actuators have the advantage of simpler manufacturability and are therefore easier to obtain. A combination of a cylindrical and a non-cylindrical actuator can on the one hand enjoy the advantage of using a cylindrical, preferably tubular actuator, namely a straightforward connection with the closure element. On the other hand, the non-cylindrical actuator can save cost and effort to a certain extent.

In particular, the closure element can be at least partially arranged in a cavity defined by the shape of at least one of the piezoelectric actuators, whereby it is also possible that the other piezoelectric actuator is also hollow. Such an arrangement of the closure element in a region of the cavity of one of the piezoelectric actuators is particularly compact and affords the opportunity of a very precise and simple transfer of forces between the piezoelectric actuator and the closure element. Alternatively, a tubular piezoelectric actuator can be replaced, for example, by several, preferably at least two, most preferably at least three actuator elements, arranged in parallel and operating in parallel, in particular piezo-rods or similar, which can be controlled as a group (i.e. as one actuator). These piezoelectric actuator elements or piezo-rods (realized for example as piezo-stacks) may be evenly distributed on a circumference about the closure element (or a coupling element connected thereto), and can be controlled as a group (i.e. as one actuator), in order to achieve the same effect as a tubular piezoelectric actuator.

Often, it is preferable that both piezoelectric actuators are constructed identically. This does not only save effort in coordinating both piezoelectric actuators, but also in the realization of an actuator chamber and accordingly by the coordination of the control processes.

As mentioned above, at least one of both piezoelectric actuators is preferably arranged in an actuator chamber. Particular advantages ensue when both piezoelectric actuators are arranged in a common actuator chamber. This makes it possible to optimise, and in particular to optimally coordinate, the co-action of both piezoelectric actuators and that losses do not arise. For example, it is possible to define a maximum total dimension limit for the dimensional changes, mutually effected during operation, of the first piezoelectric actuator and the second piezoelectric actuator. Such a maximum total dimension can be defined solely by the interior dimensions of the actuator chamber. However, spacers may also be arranged in the actuator chamber in order to reduce the interior dimension such that the defined maximum total dimension is achieved exactly. With such spacers, the total dimension can be varied in a defined manner, for instance by performing a precision adjustment of such a spacer from the outside of the actuator chamber, for example by means of screws or similar adjusting elements.

There are several functionally different units arranged in the dosing system according to the invention: firstly the nozzle itself, which serves to meter the ejection of the dosing material; secondly the actuator system which moves the moving parts (i.e. in particular the closure element) in the nozzle; and finally the dosing material reservoir and its feed lines to the nozzle, which provide the dosing material. Preferably, these functionally detachable units are also arranged in separate regions. In particular, it is preferred that the dosing system comprises a first housing part that encloses the nozzle, and a second housing part that retains at least one actuator (for example at least one piezoelectric actuator). The first housing part and the second housing part may preferably be connected to each other in a spring-loaded manner. Such a spring loading can serve to damp vibrations during operation of the actuator system and to provide certain tolerances. Furthermore, since the housing parts can be disconnected from each other, this ensures that the actuator system can be completely detached from the nozzle region during a maintenance procedure. Similarly, the dosing material reservoir is also preferably separate from the actuator, i.e. from the first and second piezoelectric actuators. Preferably, it is realized as a separate chamber and feed line system, mountable to the other parts of the dosing system, which can be connected by means of screws and feed line sleeves to a housing of the dosing system. It is therefore also detachable from the nozzle itself.

According to the invention, the movement of the closure element is carried out with the aid of at least one pair of piezoelectric actuators. To this end, and to regulate the pressure, the dosing system preferably comprises an electronic control unit for the control of the actuator system and/or a pressure in a dosing material reservoir of the dosing system. The control unit does not necessarily have to be inside a housing of the dosing system, but can be arranged externally. It can be connected to the inside of the dosing system housing by means of control wires. The actuator system does not behave on the basis of an inherent logic, but is controlled in an "intelligent" manner by an electronic control unit, which can for instance comprise a processor that provides software-generated control signals to the actuator system. Such control units can achieve dosing clock rates in the region of 14 kHz, which means that the movement of the closure element can be controlled very precisely.

Preferred embodiments of the invention relate to a so-called open system in which the dosing system comprises a nozzle with a closure channel, within which the closure element is moved during operation in an opening and/or closing direction, controlled by an automatic control unit, whereby the closure channel is realized in at least one cross-section perpendicular to the opening and/or closing direction relative to the cross-section of the closure element in the same plane to give an aperture gap between the outer surface of the closure element and the inner surface of the closure channel, which aperture gap is shaped and/or dimensioned, at least in places, to form an outlet channel for the dosing material.

In a particularly preferred embodiment, the control unit is realized in this context to move the closure element such that the viscosity of the dosing material is lowered in at least one region of the aperture gap.

In the context of the invention, a liquid to viscous dosing material is defined as any liquid, or any mixture comprising a liquid with flow characteristics. The definition of viscosity can extend from a viscosity greater than that of water to a viscosity that approaches the properties of a solid. In a preferred embodiment, the dosing material comprises thixotropic or shear-thinning properties, i.e. its viscosity is higher in a resting state than in an agitated state, and upon returning to a resting state, its viscosity at least approaches the original higher viscosity (after a certain resting time as the case may be). The term "viscous" may also apply to a material or medium that has the characteristics of a solid in a resting state, and which is only capable of flowing when agitated.

The mutual operation of the closure element and the closure channel is decisive for the realization of the open dosing system described herein, in the sense that a sufficiently large aperture gap, through which the dosing material can pass, is defined at least in places between the closure element and the closure channel. This aperture gap forms an outlet channel for the dosing material that is preferably connected to the outlet opening of the nozzle. In a suitable agitated state, the dosing material can flow through the outlet channel. In a non-agitated state or in a motion pattern in which the viscosity is only slightly lowered, the dosing material preferably remains in the outlet channel defined by the aperture gap without flowing any further. This means that the dimensions of the outlet channel or aperture gap is chosen such that, under the applicable pressure conditions of the dosing material in the dosing system and at a normal operating temperature, no flow or essentially no flow is ensured as soon as the dosing material is no longer in motion or is moving only slightly.

In this context, the closure element and the associated aperture channel act together against the dosing material, i.e. against the medium that is being retained by this closure. Ultimately, such a closure is formed in that an open arrangement is provided in principle, through which the dosing material can pass relatively unhindered when in a suitably agitated state, but which closes automatically on account of the thixotropic or shear-thinning properties of the dosing material when the closure element stops moving in the closure channel. Therefore, material flow does not take place during a complete resting state of the closure element relative to the closure channel. It is not necessary to close the outlet opening of the nozzle; in fact it is preferably to always leave the outlet opening uncovered. Furthermore, a deliberate dispensing of dosing material can be controlled by means of the various movement modes, as will be explained below.

The size of the cross-section of the closure element relative to the cross-section of the closure channel is chosen on the basis of the viscosity of the dosing material to be applied (or its viscosity during an agitated state) on the one hand, and on a pressure applied to the dosing material on the other hand. The following rules of thumb apply:

The higher the pressure of the dosing material, the smaller the aperture gap can be.

The lower the viscosity of the dosing material in a resting state of the dosing material, the smaller the aperture gap can be.

The lower the viscosity of the dosing material in an agitated state, the smaller the aperture gap can be.

The size of the aperture gap in cross-section, i.e. the cross-sectional area of the aperture gap, is chosen such that, during a resting state of the closure element, the dosing material does not move or moves significantly less compared to free flow under the same pressure conditions. In other words, the inventive principle lies in dimensioning the aperture gap between closure element and closure channel according to the dosing material and/or the pressure applied to the dosing material, such that, in spite of the aperture gap, a closure effect ensues within the nozzle on account of the shear viscosity of the dosing material. On the other hand, the aperture gap should also be dimensioned so that a sufficient movement of the closure element within the closure channel lowers the viscosity of the dosing material to allow the dosing material to flow through the closure channel, and to ensure a volumetric feed. In this way, the aperture gap will become a passage for the dosing material as soon as the closure element moves within the closure channel. The closing effect given by the cooperation of the closure element and closure channel is therefore temporary, and is reversed by a movement of the closure element to agitate the dosing material and make it flow.

With such a method or such a nozzle, it is possible to prepare specific, also highly viscous, thixotropic and shear-thinning dosing materials during operation of the nozzle such that they automatically alter or reduce their viscous characteristics when the closure element is moved. In contrast to the known nozzle closures—for which a closure element is pressed onto the outlet opening in order to close this, and for which the closure element is removed from the outlet opening of the nozzle in order to uncover the outlet opening—the outlet opening can be kept open at all times. Even so, disadvantages as experienced by the prior art described above do not arise. Also, the pressure applied to the dosing material does not need to be drastically increased; instead it suffices to provide the usual pressure conditions that would be applied to low-viscosity dosing materials. At the same time, the reduction in viscosity of the dosing material during operation of the nozzle allows the dosing material to be dispensed, and to be dispensed more accurately. A more accurate dispensing is possible, and a very precisely predefined droplet release of each droplet of the dosing material can be achieved. This also increases the dispensing speed, i.e. the potential throughput of the inventive dosing system.

To allow flow of the dosing material through the aperture gap, it is necessary that the aperture gap comprises at least one clearance between the outer surface of the closure element and the inner surface of the closure channel corresponding to a height of one particle of the dosing material, preferably to a distance given by at least three particles side by side, particularly preferably to a distance of at least 0.05 mm. Care should be taken that at least the largest particle of the dosing material should be able to pass through the aperture gap. The term "particle" is to be interpreted broadly in this context: it covers polymer chains or portions thereof that can be isolated under the application of shear forces on polymer chains. The "largest particle" can be defined in this context as the particles that are present under the application of shear forces that significantly reduce the viscosity: particularly in the case of dosing materials that contain polymer chains, the reduction in viscosity can result from tearing the polymer chains in places, resulting in smaller particle sizes, of which the largest must be able to pass through the aperture gap. The minimum height refers furthermore to one of the largest particles of the dosing material in the sense that, in the direction of its main axis but minimally extended, it exhibits the largest size of all particles of the dosing material. This minimum height is to be understood as the particle size that ensues when the particle is compressed within its own specific boundaries of elasticity.

Flow of the dosing material can be ensured in particular when a plurality of particles—i.e. two, preferably at least three—can fit side by side in the aperture gap. Tests have shown that an annular aperture gap is particularly suitable in achieving a controlled through-flow or a controlled closure effect. This can be achieved by a circular cross-section of the inner surface of the closure channel in combination with a circular cross-section of the closure element and a preferably axial arrangement of the closure element in the closure channel. The tests have also shown that in the case of such a circular aperture gap, under the currently typical pressure conditions, a cross-sectional gap width between 0.1 mm±10% variance is particularly suitable in order to obtain a good through-flow in a movement state of the closure element, and a good closure in a resting state of the closure element. In the case of dosing materials of the type described above, typical pressures of 0.5 to 8 bar are currently applied. Other geometries are of course also possible.

The upper limit of the extent of the aperture gap between the outer surface of the closure element and the inner surface of the closure channel, i.e. the clearance of the aperture gap, is determined as follows: the flow resistance acting on the dosing material on account of the clearance must be at least as large as a flow resistance acting on the dosing material in the region of an outlet opening of the nozzle. If the flow resistance in the region of the closure channel was smaller that in the region of the outlet opening, dosing material would not be ejected from the outlet nozzle. The results of tests and simulations are summarized in the following table of clearance (i.e. aperture gap) as dependent on the dimensions of the outlet opening and the closure element, assuming that the outlet opening is always 0.5 mm in length, and the length of the aperture gap through which the dosing material is passed is always 10 mm:

| Outlet opening diameter in mm | Closure element diameter, realized as a cylindrical plunger in the region of the aperture gap, in mm | Maximum clearance in mm |
| --- | --- | --- |
| 0.05 | 1 | 0.006 |
| 0.1 |  | 0.02 |
| 0.2 |  | 0.09 |
| 0.4 |  | 0.35 |
| 1 |  | 2.3 |
| 0.05 | 1.5 | 0.004 |
| 0.1 |  | 0.015 |
| 0.2 |  | 0.05 |
| 0.4 |  | 0.24 |
| 1 |  | 1.5 |
| 0.05 | 2 | 0.003 |
| 0.1 |  | 0.012 |
| 0.2 |  | 0.045 |
| 0.4 |  | 0.18 |
| 1 |  | 1.12 |
| 0.05 | 4 | 0.001 |
| 0.1 |  | 0.005 |
| 0.2 |  | 0.023 |
| 0.4 |  | 0.09 |
| 1 |  | 0.56 |

These parameter combinations are to be understood as preferred embodiments in each case.

Preferably, when dimensioning the aperture gap, in addition to the flow resistance it should also be considered that the dosing material should be brought slowly from a flowing to a stationary state in the aperture gap, and that the aperture gap should subsequently be closed. The aperture gap should therefore permit a certain braking effect. This braking effect is preferably always initiated when the closure element is brought into a stationary state from a movement relative to the closure channel.

Instead of having an annular or otherwise circumferential shape, the aperture gap can be formed in cross-section in a specific area only, for example as a recess in the closure element. In each case, the shape can be chosen individually depending on the field of application, particularly in consideration of the above-mentioned parameters influencing pressure on the dosing material and its viscosity. The dosing system according to the invention therefore preferably comprises a plurality of (exchangeable) closure elements and/or (exchangeable) closure channels of which at least one closure element and one closure channel have complementary shapes so that, together, they form an aperture gap of the type explained in detail above. These exchangeable arrangements can be inserted into the nozzle depending on the material to be dosed in each case. Preferably, the (exchangeable) closure elements or (exchangeable) closure channels each comprise markings to indicate their related parts and/or applicability for certain dosing materials.

In a particularly preferred embodiment of the invention, the nozzle also comprises a dosing material collection cavity in the region of the nozzle, particularly preferably in a nozzle end region bordering an outlet opening of the nozzle. This dosing material collection cavity is arranged between the closure channel and the outlet opening for the dosing material, and is formed or positioned such that it is at least not completely filled by the closure element on account of its size and position. A dosing material collection cavity is preferred whose dimensions are greater in cross-section that the total area of the aperture gap between the closure element and the closure channel. Since the dosing material that has passed through the aperture gap can be collected in this dosing material collection cavity and can then be precisely pushed through the outlet opening by a longer stroke of the closure element during a movement in the ejection direction, a well-dosed, rapid and precise ejection of the dosing material is possible, particularly in droplet form.

To provide the dosing material in the nozzle, it is supplied via a supply line from a dosing material reservoir. In principle, it is possible to use the aperture gap simply as a kind of holding area or preparatory region for the dosing material, in which portions of the supplied dosing material are deposited and made liquid by appropriate movements of the closure element. However, the dosing system preferably comprises a supply line from a dosing material reservoir to supply dosing material, whereby the supply line leads to the aperture gap formed by the closure channel and/or which is arranged at an end of the closure channel furthest away from an outlet opening of the nozzle. The supply line from the dosing material reservoir in this case leads directly or indirectly into the region of the closure channel, i.e. of the aperture gap. This has the effect that the dosing material must in any case flow at least through some part of the aperture gap, so that the aperture gap exercises an opening or closing effect for the flow of dosing material.

A seal can be arranged on the other side of the closure channel furthest away from an outlet opening of the nozzle that seals the nozzle against an actuator region of the dosing system so that, in normal use, the dosing material cannot pass the seal. This seal, for example a ring seal in the region in which the closure element is connected with the actuator region, seals off the actuator region and other functional regions of the dosing system effectively, and in a manner that is easy to realize.

As mentioned above, the dosing system according to the invention preferably also comprises a dosing material reservoir, which is connected to the nozzle by means of a feed line in the direction of an outlet opening. Provisioning of the dosing material is therefore effected within the dosing system, so that this can be constructed and transported as one unit.

Within this context, it is preferable that the control unit is realized to generate control signals during operation for different movements of the closure element in at least two movement modes. Such movement modes, i.e. levels of quality of the movement of the closure element, in which the closure element follows different movement patterns, can serve in particular to cover different functions during the dispensing procedure of the dosing material. In this way, for example, individual and very precisely dosed droplets can be dispensed.

A first such function can be, for example, maintaining the dosing material in a liquid state. To this end, a first movement mode preferably comprises a movement pattern with extremely fine up-and-down movements of the closure element, whose stroke (i.e. amplitude) and/or frequency and/or sequence are chosen to be suitable for overcoming forces within the dosing material in order to reduce its viscosity significantly, i.e. by at least 50%, preferably by at least 99%. An "extremely fine" up-and-down movement is to be understood as a movement whose stroke is less than, and whose frequency is greater than a movement in a second movement mode (described in more detail below). Preferably, the frequency of the extremely fine movement is greater than 10 kHz. With the appropriate choice of frequency or sequence (higher in comparison to the second movement mode), a simple oscillation movement with very small stroke is sufficient to achieve such a reduction in viscosity. This first movement mode also serves to ensure the flow of the dosing material. Preferably however, under the usual pressure of the dosing material in the dosing system, the movement mode with the extremely fine oscillation movements will not—on its own—result in dosing material flowing out of the nozzle.

A second such function preferably serves to eject dosing material through the outlet opening of the nozzle. To this end, a second movement mode comprises a movement pattern with ejection movements of the closure element, whose stroke and/or frequency and/or sequence are chosen to be suitable for pushing the dosing material through an outlet opening of the nozzle in the form of droplets or a jet, whenever the closure element is moved in the ejection direction. When the closure element is moved in a retraction direction, opposite in direction to the ejection direction, dosing material in the nozzle can flow in front of the closure element, to be ejected from the nozzle with the next movement in the ejection direction. In this second type of movement pattern, the stroke length is preferably longer that in the extremely fine motion pattern of the first movement mode described above, while the frequency can be lower, and a sequence can have longer intervals than a sequence used in the first function.

It shall be noted that a movement mode can also be defined in that the closure element does not actually move. This movement mode can be referred to as a still-stand or closure mode, since the dosing material is first slowed down by the complete inactivity of the closure element and then remains in a resting state. In this resting state, its viscosity increases significantly, so that flow is no longer possible through the aperture gap.

A further movement mode can preferably comprise a motion pattern with up-and-down movements between two bounding positions, whereby the closure element is retained in at least one of the bounding positions for a certain duration. This is particularly favourable in a movement mode that is used to eject dosing material from the outlet opening of the nozzle. It can deliberately ensure that, in a particular position of the closure element, the dosing material can first flow in front of the closure element prior to an ejection of the dosing material or that, after a drop has been ejected, the dosing material initially settles somewhat so that its flow is slowed down more.

In a particularly preferred embodiment, the control unit is realised or programmed to combine the various movements i.e. the various motion patterns and/or movement modes. For example, a movement mode can preferably comprise a superposition of various motion patterns. In particular, the movements of the first and second functions described above can be superposed, so that, for example, oscillations according to the first motion pattern are combined with large-stroke ejection movements according to the second motion pattern, so that the ejection movements exhibit a kind of jitter. Preferably, the various movement modes are carried out consecutively, preferably alternately. The alternating execution has the advantage that ejection of the dosing material can be achieved very deliberately and at precisely determined times.

The motion patterns that are to be carried out in the individual movement modes, for example which exact parameters (stroke, frequency etc.) are comprised in the motion patterns and whether there is a superposition of motion patterns and in which order the movement modes are carried out, depend on the parameters of the dosing material as well as the actual dosing assignment (for example whether the dosing material is to be dispensed drop-wise and if yes, the drop size and the time intervals). The control unit can therefore preferably comprise a memory for storing the motion patterns and movement mode sequences for various dosing materials and dosing tasks.

Other objects and features of the present invention will become apparent from the following detailed descriptions considered in conjunction with the accompanying drawings. In the diagrams, like numbers refer to like objects throughout.

FIG. 1 shows a front view of an embodiment of a dosing system according to the invention;

FIG. 2 shows a side view of the same dosing system of FIG. 1 along a section A-A;

FIG. 3 shows a detailed view of the section of FIG. 2;

FIG. 4 shows a sectional view of the same dosing system of FIG. 1 along a section B-B;

FIG. 5 shows a detailed view of the section of FIG. 4;

FIG. 6 shows a schematic representation of a path of motion of a closure element in a first embodiment of the method according to the invention;

FIG. 7 shows a schematic representation of a path of motion of a closure element in a second embodiment of the method according to the invention;

FIG. 8 shows a schematic representation of a path of motion of a closure element in a third embodiment of the method according to the invention FIG. 9 shows a schematic representation of a path of motion of a closure element in a fourth embodiment of the method according to the invention.

FIGS. 1 and 2 show a dosing system according to an embodiment of the invention, while FIG. 3 shows a detail of FIG. 2. The dosing system 3 comprises a nozzle 1, a dosing material container 5 with a dosing material reservoir 7 and a housing 35, in which an actuator chamber 25 is arranged in addition to the nozzle 1.

The housing 35 comprises a first, lower housing part 37 and a second, upper housing part 39. The two housing parts 37, 39 are connected to each other in a spring-loaded manner by means of holding screws 41 and by means of vertically mounted springs 43 connected to the holding screws 41. A gap, i.e. a certain play, ensues on both sides along the edge between the two housing parts 37, 39.

The actuator chamber 25 is arranged centrally in an actuator region 59 in the housing. A first piezoelectric actuator 23*a* and a second piezoelectric actuator 23*b* are oriented in a direction along a (central) axis X and positioned along the direction of the axis X. Together, the piezoelectric actuators 23*a*, 23*b* give an actuator system 61. The actuator chamber 25 is closed at the upper side by a spacer 27, whose position can be adjusted from the outside of the housing 35 by means of a spacer adjusting screw 29. Two contact terminals 31, 33 serve to connect an electronic control unit 63 to the two piezoelectric actuators 32*a*, 23*b*, at a maximum voltage of 240 V.

The two piezoelectric actuators 23*a*, 23*b* are realized as tubular, cylindrical piezoelectric actuators 23*a*, 23*b* and are arranged to travel essentially in an axial direction along the axis X during operation. Preferably, the piezoelectric actuators 23*a*, 23*b* are piezo-stacks of annular piezo-elements. Within the cavity of the first piezoelectric actuator 23*a*, a longitudinal connector element 51 is arranged that fills the entire cavity and projects outwards in the manner of a collar from above the end of the first piezoelectric actuator 23*a* that faces the second piezoelectric actuator 23*b*. In this way, the connector element 51 connects the two piezoelectric actuators 23*a*, 23*b* in the region of its collar in a form-fit and force-fit way, and ensures a mechanical coupling of forces between them. To stabilize its position, it extends a little into a cavity 52 of the second piezoelectric actuator 23*b*. Alternatively, a tubular piezoelectric actuator 23*a*, 23*b* can be replaced, for example, by several, preferably at least two, most preferably at least three piezo-rods (for example also in the form of piezo-stacks) arranged in parallel and operating in parallel. These piezo-rods can for example be evenly distributed on a circumference, and can be controlled as a group (i.e. as an actuator), in order to achieve the same effect as a tubular piezoelectric actuator 23*a*, 23*b*. In other words, the direction of motion of the connection element 51 is coaxial to the effective direction axis of the parallel-connected piezo-rods behaving as a single actuator.

The two piezoelectric actuators 23*a*, 23*b* are driven in an offset or counterbalanced manner. This means that the first piezoelectric actuator 23*a* reduces its overall length in a longitudinal direction, i.e. in a vertical direction, while the second piezoelectric actuator 23*b* increases its length in the same direction by the same amount, at the same time. Equally, the first piezoelectric actuator 23*a* increases its overall length in the longitudinal direction, while the second piezoelectric actuator 23*b* decreases its length in the same direction by the same amount, at the same time. This means that, during operation of the actuator system, the overall length of the two piezoelectric actuators 23*a*, 23*b* along the axis X remains essentially unchanged at all times. By coupling the connecting element 51 to the actuators 23*a*, 23*b* at the joint (or contact position) between the actuators 23*a*, 23*b*, the connecting element 51 will always be pushed away from the currently lengthening actuator 23*a*, 23*b*, while the other actuator 23*a*, 23*b* makes room but remains in contact with the connecting element 51 and thereby even exerts a slight counter-pressure. In this way, the connecting element 51 is securely held in a compact actuator assembly during an up-and-down motion, and the lengthening piezoelectric actuator 23*a*, 23*b* remains preloaded.

A closure element 21 in the form of a longitudinal ceramic plunger 21 extends into the connecting element 51 in the first piezoelectric actuator 23*a*. Ceramic closure elements are particularly suitable due to their extreme lightness. The housing and nozzle parts surrounding the closure element 21 are preferably made of a high-strength material such as titanium. The plunger 21 is connected to the first piezoelectric actuator 23*a* by means of a guide element 47 screwed into the connecting element 51 (above the collar of the connecting element 51). The plunger 21 is also arranged along the axis X and is held in this orientation by the guide element 47. To this end, the guide element 47 is arranged about the plunger 21 in the manner of a sleeve, and engages in a form-fit manner with an upper wider region of the plunger 21.

The end of the plunger 21 facing away from the first piezoelectric actuator 23*a* extends into the region of the nozzle 1. It is passed though a seal 45, namely a ring seal 45, and extends into a closure channel 55. This closure channel 55 is formed by a cylindrical sheath-like element 55, which encloses a cylindrical cavity in its interior. At the lower end of the plunger 21, the closure channel 55 is adjoined by a dosing material collection cavity 17, below which lies the outlet opening 19 of the nozzle 1. This dosing material collection cavity 17 is formed such that the plunger 21, on account of its shape and position, cannot entirely fill the cavity in any of its operating positions.

A feed inlet 15 of a supply line 13 is arranged above the closure channel 55, namely between the ring seal 45 and the closure channel 55, to feed dosing material in the direction of the nozzle 1 from the dosing material reservoir 7 through a connecting stopper 11.

The dosing material reservoir 7 is pressure-charged, so that the dosing material is pressed through the supply line 13 in the direction of the nozzle 1. A fastener 9 serves to connect the dosing material reservoir 7 to the other parts of the dosing system 3.

During operation of the dosing system 3, the electronic control unit 63 generates first control signals $SS_1$ and second control signals $SS_2$, which are forwarded to the two piezoelectric actuators 23*a*, 23*b* via the contact terminals 31, 33 and which control their movement, i.e. their displacement. These control signals $SS_1$, $SS_2$ are such that the two piezoelectric actuators 23*a*, 23*b* are driven to counteract each other. This achieves the mutually opposite motion pattern described above for the two piezoelectric actuators 23*a*, 23*b*. The movement of the first piezoelectric actuator 23*a*, which is effectively connected to the plunger 21, results in an up-and-down movement of the plunger 21. When the second piezoelectric actuator 23*b* contracts while the first piezoelectric actuator 23*a* is simultaneously extending, the plunger 21 will be pushed by the first piezoelectric actuator 23*a* up into the retraction direction R. In the case of the opposite movement, the plunger 21 will be pushed downwards by the second piezoelectric actuator 23*b* in the ejection direction. The effective direction axis WR, shared in this case by the two piezoelectric actuators 23*a*, 23*b*, is oriented along the axis X as are the ejection and retraction directions E, R, whereby the coupling of the plunger 21 with the actuator system formed by the first piezoelectric actuator 23*a* and second piezoelectric actuator 23*b* at the junction between the two piezoelectric actuators 23*a*, 23*b* ensures that the plunger 21 is always pushed in the desired direction by the currently extending piezoelectric actuator 23*a*, 23*b*.

In this context, it should be mentioned than an "opening" and a "closing" of the nozzle in the context of the invention is to be understood differently from non-open systems of the prior art. This is because the opening effect in this exemplary embodiment of the dosing system 3 according to the invention is better described as an ejection effect instead of a mere opening effect. This ejection effect ensues in that the plunger 21 penetrates into an upper region of the dosing material collection cavity 17 and generates an overpressure such that the dosing material collected therein is forced out of the outlet opening 19. Accordingly, the ejection direction can also be referred to as an "opening direction". In the known dosing systems, in contrast, a plunger would have an opening effect in the exact opposite direction: it would uncover an outlet opening of a nozzle and thereby allow passage through the outlet opening. On the other hand, the nozzle is "closed" after the ejection when the plunger is moved back in the opposite retraction direction, e.g. in a completely retracted position or a resting state (for example with both actuators in an intermediate position). In the present case, no further dosing material escapes from the nozzle owing to the small opening of the nozzle and the high viscosity of the dosing material under the applicable pressure conditions of the dosing material in the dosing system. In this respect, the retraction direction can also be regarded as a "closing direction".

Figure 1:
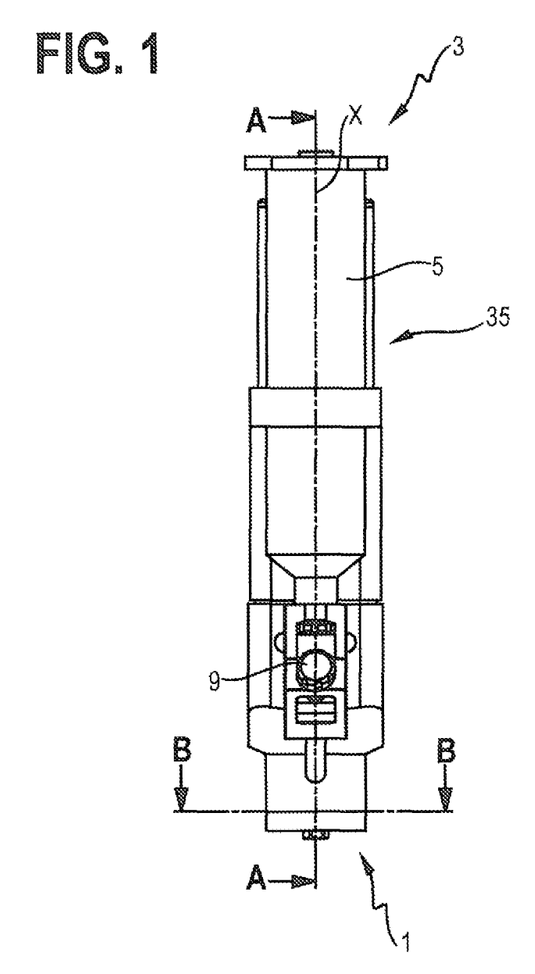
Figure 2:
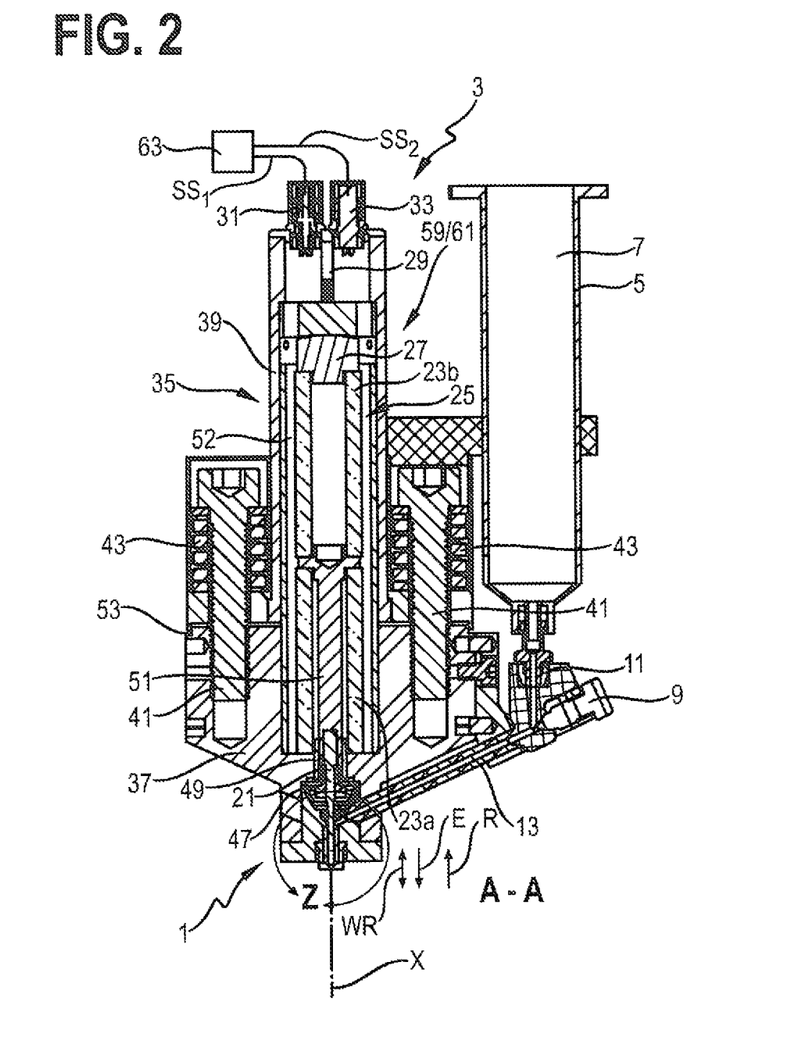
Figure 3:
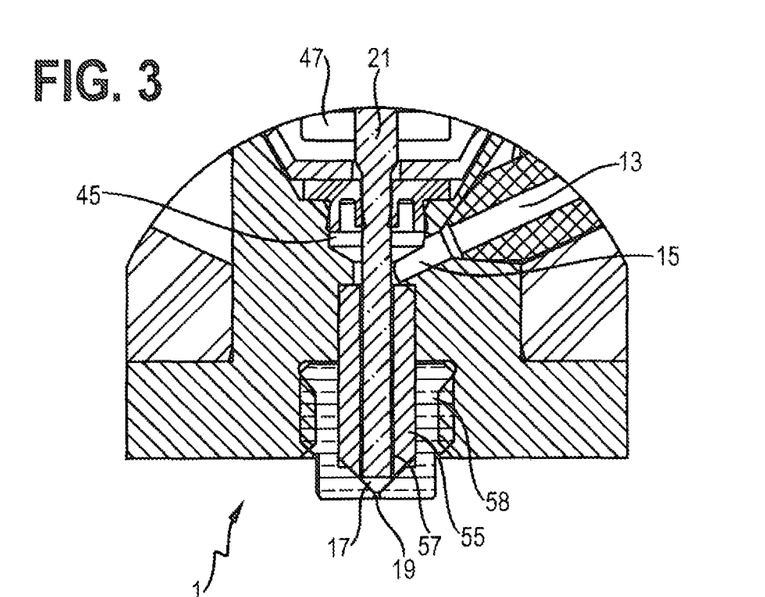
Figure 4:
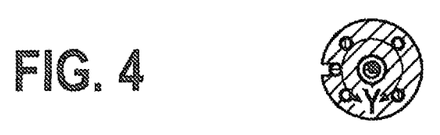
Figure 5:
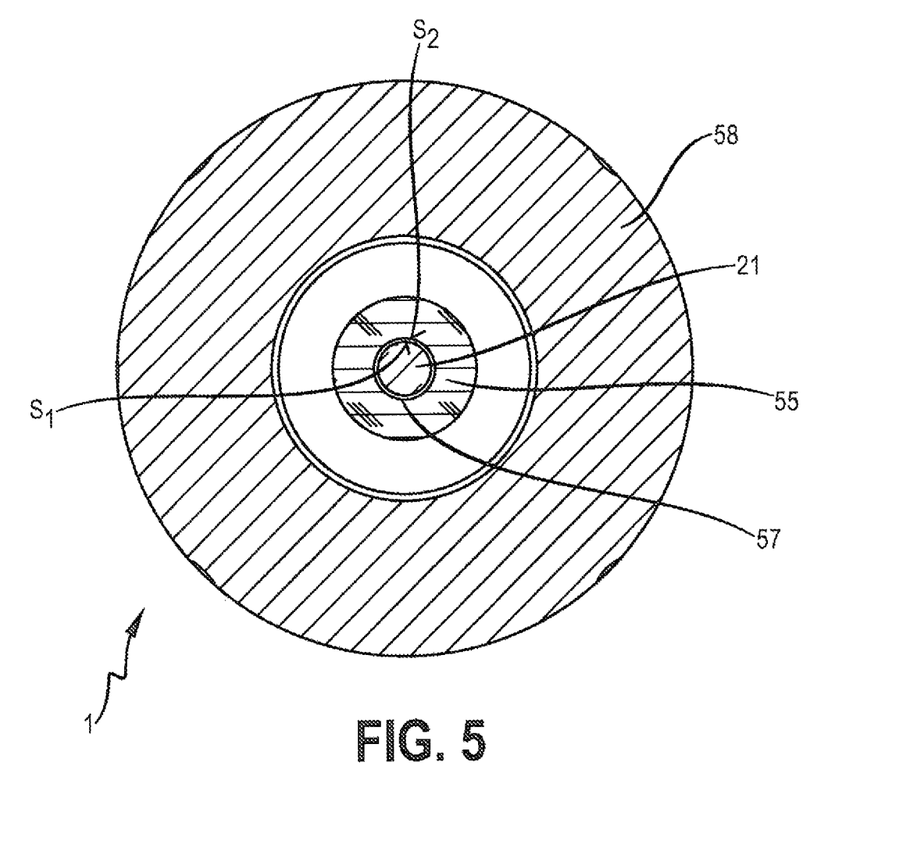

The specific ejection/opening effect and closing effect of the dosing system 3 or the nozzle 1 will be explained in more detail in the following with reference to FIG. 5, which shows a detailed view of a region Y of FIG. 4, which in turn shows a section of the nozzle 1 of the dosing system 3 along a section line B-B of FIG. 1. It can be seen that the closure channel 55 is centrally arranged inside an annularly formed holding arrangement 58 of the nozzle 1. Its midpoint lies exactly on the axis X (cf. FIG. 2). The plunger 21 is arranged in the closure channel 55. In this cross-section and (as is preferred according to the invention) in all cross-sections along the longitudinal direction of the closure channel 55, there is a circumferential annular aperture gap 57 (which also preferably has the same area in each cross-section) between the plunger 21 and the closure channel 55. The aperture gap 57 comprises a clearance of 0.1 mm between the outer surface $S_1$ of the plunger 21 and the inner surface $S_2$ of the closure channel 55. Theoretically, the dosing material can flow through this aperture gap 57 under appropriate pressure conditions from the dosing material reservoir 7 in the direction of the outlet opening 19 of the nozzle 1, as long as its viscosity is sufficiently low.

However, since the dosing material is a shear-thinning or thixotropic mixture with a high viscosity, the distance between the two surfaces $S_1$, $S_2$ is chosen to be 0.1 mm such that its viscosity is sufficiently great in the resting state and the dosing material is retained in the aperture gap 57. This applies therefore to a resting state of the plunger 21, during which flow through the aperture gap 57 is not permitted. When the plunger 21 is caused to move according to a suitable movement pattern, the viscosity of the dosing material can be reduced to an extent that permits a relative easy passage through the aperture gap 57.

This has the effect that the dosing material can flow practically freely from the feed inlet 15 in the direction of the dosing material collection cavity 17. Here, it collects and can be ejected by a deliberate ejection movement of the plunger 21.

Each of the piezoelectric actuators 23a, 23b has a stroke of 0.069 mm. A stroke that is smaller than this 0.069 mm is enough in order to overcome the viscosity of the dosing material. Ultimately, in the case of many dosing materials, a slight oscillation of the plunger 21 is enough to overcome the shear forces within the dosing material, so that its passage through the aperture gap 57 is made possible.

Figure 6:
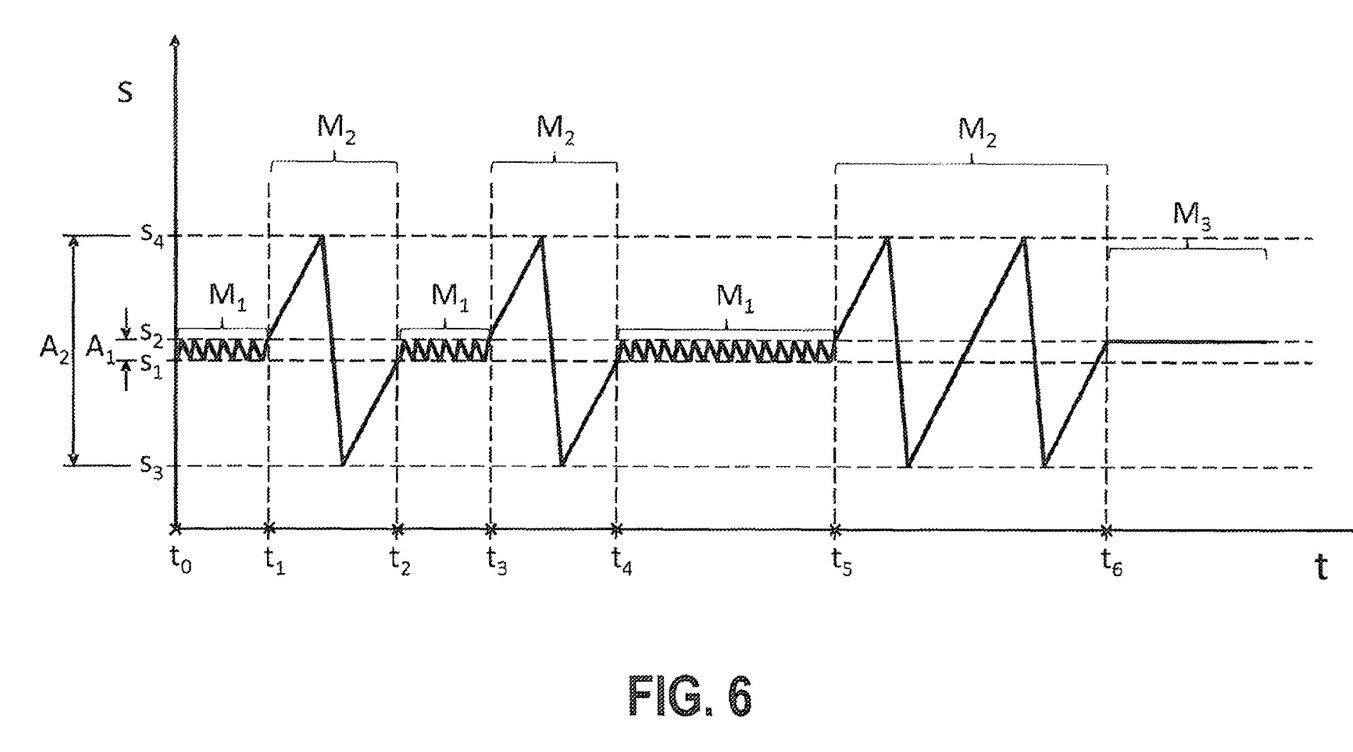

In this context, FIG. 6 schematically shows one possible motion pattern of the plunger 21. The path s (not to any scale) of the plunger 21 is shown against time t (also not to any scale). It can be seen that the plunger 21 carries out three different movement modes $M_1$, $M_2$, $M_3$.

A first movement mode $M_1$ is performed between a zero time instant $t_0$ and a first time instant $t_1$, between a second time instant $t_2$ and a third time instant $t_3$ and between a fourth time instant $t_4$ and a fifth time instant $t_5$. This movement mode $M_1$ comprises small, relative rapid oscillations between two positions $s_1$, $s_2$. Here, the movement of the plunger 21 has only small amplitude $A_1$ or a short stroke $A_1$, with a uniform rate and a relatively high frequency. This movement serves exclusively to maintain the liquidity of the dosing material, whereby it is not liquefied to the extent that dosing material would continually seep from the nozzle. The first movement mode $M_1$ may therefore be characterized as a liquidity maintenance mode.

In contrast, the second movement mode $M_2$, performed between the first time instant $t_1$ and the second time instant $t_2$, between the third time instant $t_3$ and the fourth time instant $t_4$, and between the fifth time instant $t_5$ and a sixth time instant $t_6$ comprises a different pattern of motion. It serves to eject dosing material from the dosing material collection cavity 17 and may therefore be described as an ejection mode. For this reason it has a greater amplitude $A_2$ or longer stroke $A_2$. Its frequency, which can be clearly seen in the double ejection movement between the fifth time instant $t_5$ and the sixth time instant $t_6$, is significantly lower than that of the motion in the first movement mode $M_1$. The rate of this movement can also be described as uniform. The third movement mode $M_3$, performed after the sixth time instant $t_6$, comprises a simple stand-still of the plunger 21 and has the effect that the dosing material is initially slowed in the aperture gap 57 due to its inner friction, and then held, since its viscosity is no longer reduced by any motion of the plunger 21.

Figure 7:
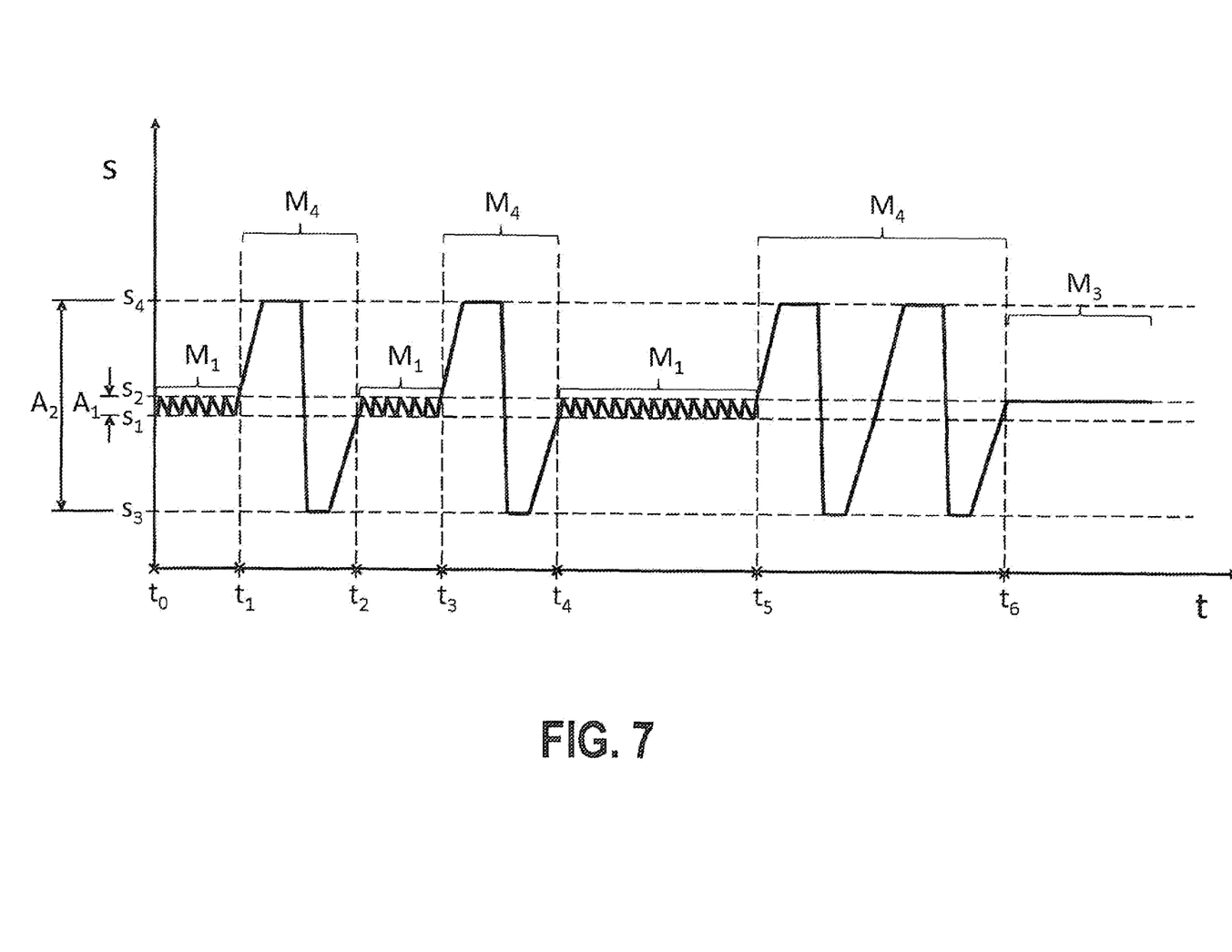

The motion pattern of FIG. 7 differs from the motion graph of FIG. 6 only in the ejection mode $M_4$. Instead of a simple saw-tooth up-and-down movement as in the second movement mode $M_2$ of FIG. 6, the plunger 21 maintains its uppermost position $s_4$ for a certain duration. During this time, dosing material can flow in front of the plunger 21. This is followed by a very rapid movement of the plunger 21 in the ejection direction E. The plunger 21 once again maintains its lowermost position $s_3$ in the ejection direction for a certain duration. During this time, the movement of the dosing material is somewhat checked, in order to avoid a delayed release of dosing material with the subsequent movement of the plunger 21 in the retraction direction.

Figure 8:
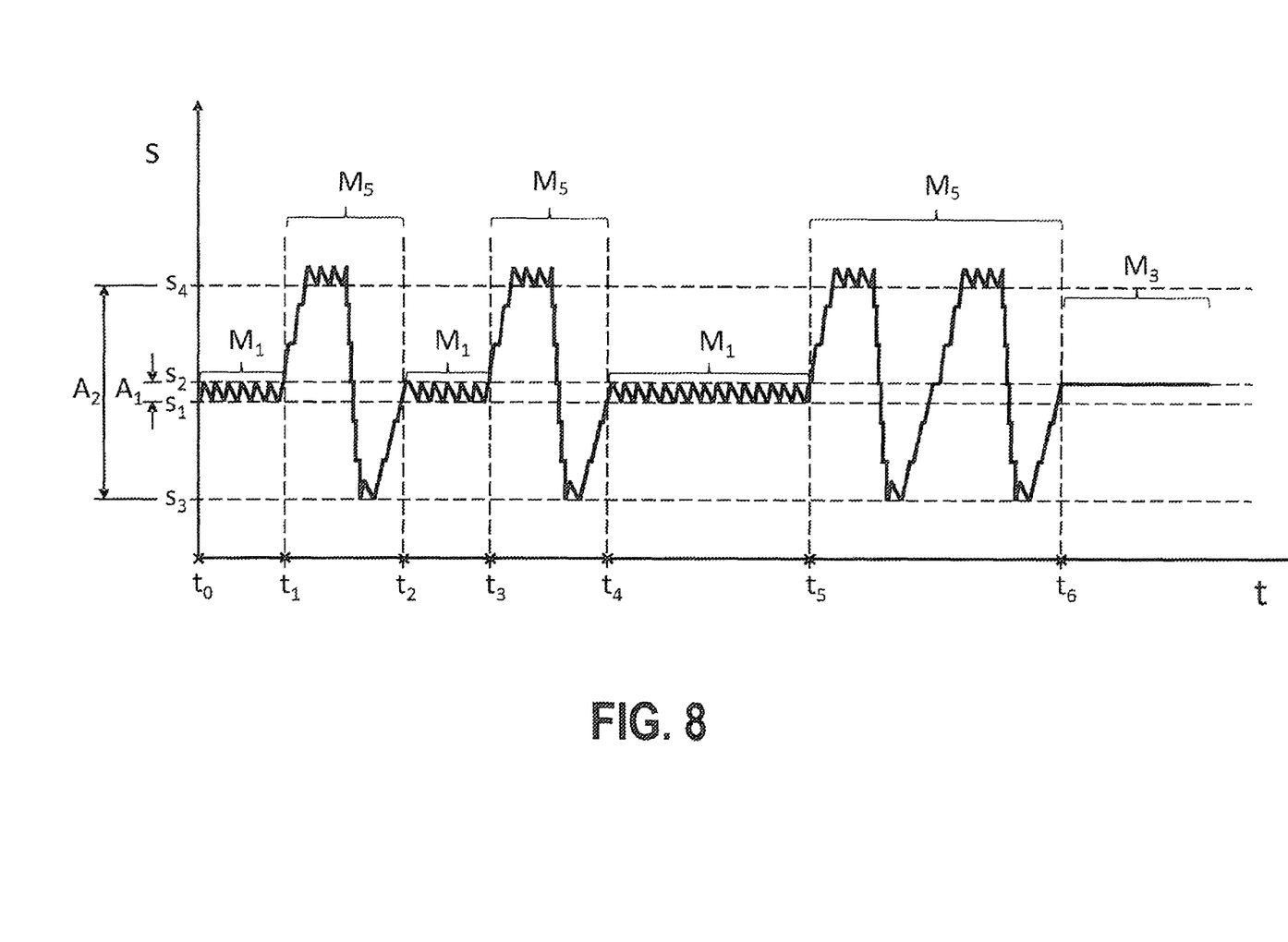

The motion pattern of FIG. 8 again differs from the motion graph of FIG. 7 only in the ejection mode $M_5$. Here, the motion pattern in the first movement mode $M_1$—i.e. the jittering motion of the plunger 21—is superposed during the ejection movement on the motion pattern of the movement mode shown in FIG. 7. This is expedient when the viscosity of the dosing material increases relatively quickly when the extremely fine jitter motion ceases. Superposing the motion patterns ensures that the viscosity of the dosing material is continually lowered.

Figure 9:
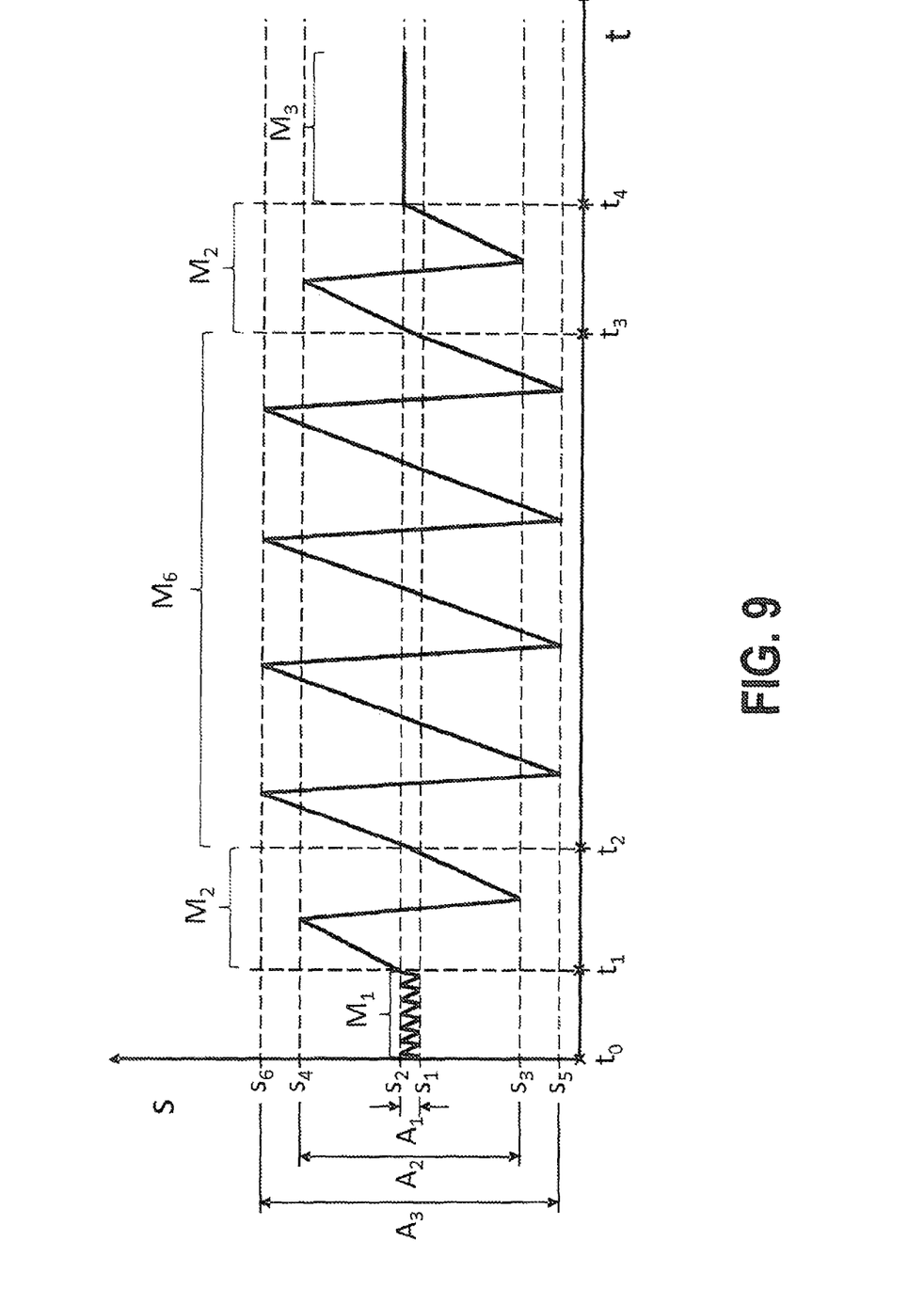

FIG. 9 shows a motion pattern that can for instance be suitable for applying a "rope", i.e. an uninterrupted band of uniform thickness, by closely depositing individual dots of dosing material side by side. Depending on the dosing material, the first and last drops might be larger than the intermediate drops, even if the stroke length of the plunger 21 was the same for each drop. In this case, it can be expedient to apply different ejection modes $M_2$, $M_6$, that only differ in their stroke lengths. For example, for the first and last drops, a movement mode $M_2$ can be selected that has a shorter stroke than for the intermediate drops.

The examples clearly show that it is ideally possible with the invention to precisely adjust the specific parameters of the different movement modes and the sequence of the movement modes to each of the dosage materials to be processed as well as to the dosing assignment. It shall once again be pointed out that the components of the dosing system or the nozzle and the actuator system described in detail above are simply exemplary embodiments that may be modified in various ways by the skilled person and whose features may be combined in new ways without leaving the scope of the invention.

For the sake of clarity, it is to be understood that the use of "a" or "an" throughout this application does not exclude a plurality. Furthermore, a "unit" may comprise one or more components that may also be spatially separate.

List of Reference Signs
1 nozzle
3 dosing system
5 dosing material container
7 dosing material reservoir
9 connecting screw
11 connecting stopper
13 supply line
15 feed inlet
17 dosing material collection cavity
19 outlet opening
21 closure element—plunger
23a first piezoelectric actuator
23b second piezoelectric actuator
25 actuator chamber
27 spacer
29 spacer adjusting screw
31 contact terminal
33 contact terminal
35 housing
37 first housing part
39 second housing part
41 retaining screws
43 springs
45 seal—ring seal
47 guiding element
49 connecting element
51 connecting element
52 cavity
53 gap
55 closure channel
58 holding means
59 actuator region
61 actuator system
63 electronic control unit
$A_1$, $A_2$ amplitude—travel
E ejection direction
$M_1$ movement mode—liquid retention mode
$M_2$ movement mode—ejection mode
$M_3$ movement mode—still-stand
$M_4$ movement mode—ejection mode
$M_5$ movement mode—ejection mode
$M_6$ movement mode—ejection mode
R retraction direction
s path
$S_1$ outside surface
$s_1$, $s_2$, $s_3$, $s_4$ positions
$S_2$ inside surface
$SS_1$ first control signal
$SS_2$ second control signal
t time
$t_0$, $t_1$, $t_2$, $t_3$, $t_4$, $t_5$, $t_6$ time instances
WR effective direction axis
X (central) axis
Y region

The invention claimed is:

1. A dosing system comprising a nozzle, with an outlet opening, in the region of which a closure element is movably arranged, which is moved during operation in an ejection direction and/or a retraction direction, which closure element is coupled to at least two piezoelectric actuators connected in opposite directions such that a first piezoelectric actuator, when it is expanded in operation, moves the closure element in the retraction direction, and a second piezoelectric actuator, when it is expanded in operation, moves the closure element in the ejection direction.

2. The dosing system according to claim 1, wherein the first piezoelectric actuator and the second piezoelectric actuator are arranged such that the ejection direction and the retraction direction of the closure element lie essentially along an effective direction axis of the piezoelectric actuators.

3. The dosing system according to claim 2, whereby the effective direction axes of the two piezoelectric actuators coincide in a single effective direction axis.

4. The dosing system according to claim 1, wherein the closure element is coupled to the first piezoelectric actuator and the second piezoelectric actuator at a junction between the first piezoelectric actuator and the second piezoelectric actuator.

5. The dosing system according to claim 1, whereby a dimensional change of the first piezoelectric actuator balances a dimensional change of the second piezoelectric actuator during operation, and a dimensional change of the second piezoelectric actuator, balances a dimensional change of the first piezoelectric actuator during operation.

6. The dosing system according to claim 1, whereby at least one of the piezoelectric actuators comprises a cylindrical form.

7. The dosing system according to claim 6, whereby the closure element is at least partially arranged in a cavity defined by the shape of at least one of the piezoelectric actuators, or is surrounded by a group of several piezoelectric actuator elements of a piezoelectric actuator, arranged in parallel and acting in parallel.

8. The dosing system according to claim 7, whereby the closure element is secured to the first piezoelectric actuator.

9. The dosing system according to claim 7, whereby the closure element is surrounded by at least three piezoelectric actuator elements of the piezoelectric actuator.

10. The dosing system according to claim 1, whereby the first piezoelectric actuator and the second piezoelectric actuator are arranged in a common actuator chamber.

11. The dosing system according to claim 10, whereby the first piezoelectric actuator and the second piezoelectric actuator are limited during operation to a defined maximum overall dimension in their combined dimensional changes within the actuator chamber.

12. The dosing system according to claim 1, comprising a first housing part that encloses the nozzle, and a second housing part that secures at least one of the two piezoelectric actuators.

13. The dosing system according to claim 12, wherein the first housing part and the second housing part are flexibly connected by means of springs.

14. The dosing system according to claim 1, comprising a dosing material reservoir separated from the first piezoelectric actuator and/or from the second piezoelectric actuator, and connected to the nozzle by means of a supply line in the direction of the outlet opening.

15. The dosing system according to claim 1, comprising:
an electronic control unit for controlling the first piezoelectric actuator and/or the second piezoelectric actuator and/or a pressure in a dosing material reservoir of the dosing system.

16. A dosing method for dosing a material by means of a dosing system with a nozzle comprising an outlet opening, in the region of which a closure element is moved in a retraction direction by the expansion of a first piezoelectric actuator, and is moved in an ejection direction by the expansion of a second piezoelectric actuator to eject dosage material from the nozzle.

17. A manufacturing method for a dosing system, comprising at least the following steps:
providing a nozzle, which comprises an outlet opening,
moveably arranging a closure element in the region of the nozzle,
coupling of the closure element with at least two piezoelectric actuators, whereby the piezoelectric actuators are arranged and coupled with the closure element such that a first piezoelectric actuator, when it is expanded in operation, moves the closure element in a retraction direction, and a second piezoelectric actuator, when it is expanded in operation, moves the closure element in an ejection direction.

* * * * *